United States Patent
Ward

[11] Patent Number: 5,079,842
[45] Date of Patent: Jan. 14, 1992

[54] CUTTING GUIDE

[75] Inventor: Jonathan Ward, Nuneaton, Great Britain

[73] Assignee: Duralay Limited, Lancashire, Great Britain

[21] Appl. No.: 469,402

[22] PCT Filed: Sep. 30, 1988

[86] PCT No.: PCT/GB88/00805
§ 371 Date: Apr. 23, 1990
§ 102(e) Date: Apr. 23, 1990

[87] PCT Pub. No.: WO89/02812
PCT Pub. Date: Apr. 6, 1989

[30] Foreign Application Priority Data
Oct. 2, 1987 [GB] United Kingdom ............ 8723224

[51] Int. Cl.$^5$ .................... B26B 29/00; G01B 1/00
[52] U.S. Cl. ................................ 30/289; 33/257
[58] Field of Search ............ 30/289, 290, 286; 33/526, 527, 562, 563

[56] References Cited
U.S. PATENT DOCUMENTS
3,772,793 11/1973 Anderson et al. ............... 33/527

Primary Examiner—Douglas D. Watts

[57] ABSTRACT

A cutting guide for use in making a cut in a carpet comprises an elongate base including a substantially flat upper surface portion and a channel which extends along the base. The inner side walls of the channel are at an oblique angle relative to the upper surface portion so that when the guide is placed underneath a carpet and a knife drawn along the channel in contact with a side wall, the cut edge thereby produced in the carpet is at an oblique angle to the plane of the carpet. When two such edges of different portions of carpet are abutted together, a tidy unobtrusive seam is produced.

6 Claims, 1 Drawing Sheet

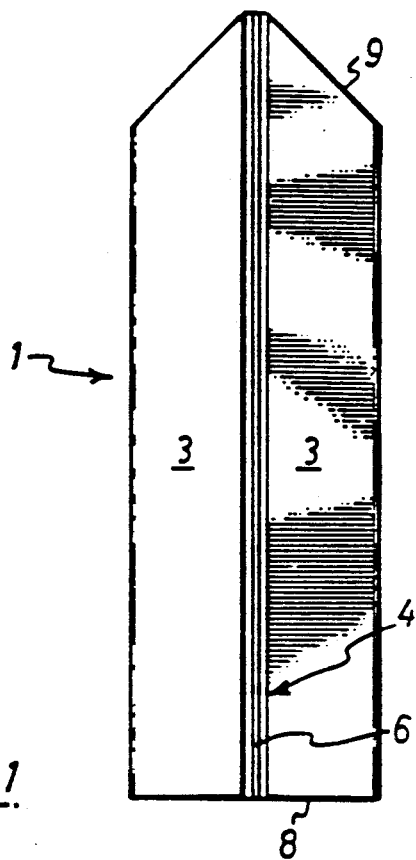
Fig_1
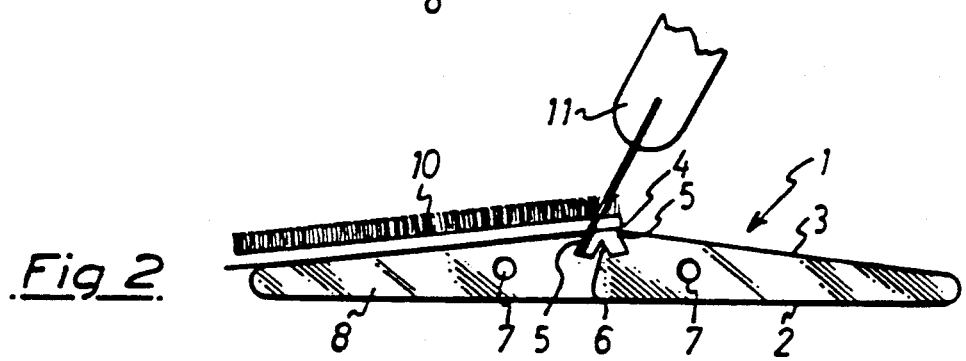
Fig_2
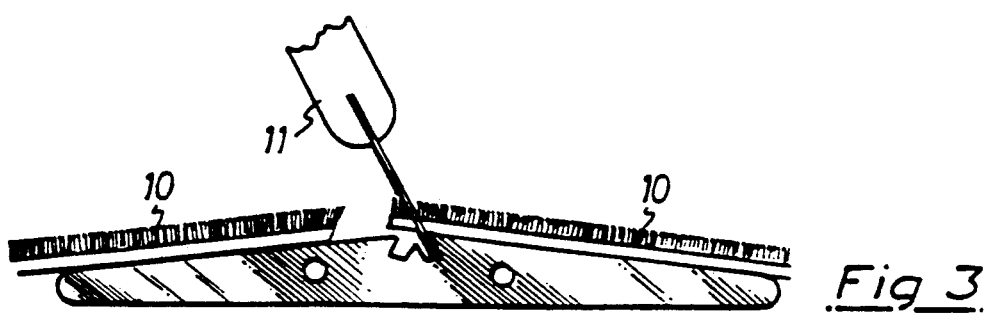
Fig_3

CUTTING GUIDE

The invention relates to a guide for use in making a cut in a flexible sheet member such as a carpet.

The laying of floor coverings such as carpets often necessitates the forming of straight seams, which are to be as tidy and unobtrusive as possible.

Carpets are often formed of tufts of material embedded in a flexible backing. A problem arises when forming straight edges in portions of carpet which need to be abutted together. A cut often leaves half cut tufts and missing tufts along the cut edge of the carpet. When a seam is formed between two such edges of adjoining portions of carpet, the result is an obtrusive seam or "valley" of missing tufts.

There is a need to form an edge in a portion of flexible sheet member or floor covering such as a carpet, so that a tidy unobtrusive seam will be made when that edge is abutted against another edge, e.g., of another portion of carpet.

According to one aspect of the invention, there is provided a guide for use in making a cut in a flexible sheet, such as a carpet, the guide comprising a base having a substantially flat upper surface portion, an elongate channel to receive a cutting device such as the blade of a knife extending adjacent the upper surface portion, the flexible sheet being arranged in use to overlie the upper surface portion and the channel, wherein an inner sidewall of the channel is at an oblique angle relative to the upper surface portion and the cutting device in use is urged towards that inner side wall to produce a cut which is at an oblique angle to the plane of the sheet.

In a preferred embodiment, the opposing inner side walls of the channel are inclined downwardly and diverge at a first angle.

Preferably the floor of the channel includes a generally central longitudinal ridge to divide the channel into two portions.

In another aspect of the invention there is provided a method of joining two portions of a carpet or like sheet material in side-by-side relation comprising the steps of:

placing the channel of a guide according to the invention under the margin of the first portion of the carpet;

inserting the blade of a knife in the channel and urging the blade towards that inner side wall of the channel which is adjacent the body of the carpet;

moving the knife along the channel so as to make a cut along the length of the carpet, at an oblique angle to the plane of the carpet;

discarding the marginal strip thereby cut off;

placing the second portion of carpet to be joined so that its margin overlies the channel and repeating the above steps;

removing the guide; and allowing the cut edges to fall together and sticking them with an adhesive or sewing them together.

Guides for cutting heavy fabrics such as rugs are known from U.S. Pat. No. 3, 772,793, but this guide is not for use in producing an oblique cut. In order that the invention may be better understood it will be described with reference to the accompanying drawings in which;

FIG. 1 is a plan view from above of one embodiment of the guide of the invention; and FIGS. 2 and 3 are schematic views from one end of a guide according to FIG. 1 in use.

The guide comprises an elongate base 1 formed, e.g., as an extrusion from aluminium, lightweight alloy or the like. The base 1 has a substantially flat underside 2. The upper surface is formed with two opposing side ramp portions 3 and an elongate channel 4 extends along the apex of the base 1. The inner side walls 5 of the channel 4 extend downwardly from the upper surface and diverge from each other at a first angle. A short raised ridge 6 (FIG. 2) extends longitudinally along the centre of the floor of the channel 4, the side walls of the ridge 6 extending generally parallel to the facing inner side walls 5, better to guide a knife blade 11 to cut along a predetermined path, as explained below.

The guide is formed with elongate holes 7 extending inwardly to the base 1 from one end face 8. Lengths of dowling or similar (not shown) may be received in these holes 7 to join one guide to another in an end-to-end relation. The other end face 9 of the base 1 is mitred. In this way, the guide may easily be moved along under a carpet. The mitred end face 9 is also useful when it is desirable to cut the carpet at an angle of 45° relative to a wall.

In use, the guide is placed under the margin of the first portion of a carpet or flexible sheet member 10 to be joined, and as shown in FIG. 2. The blade of a cutting tool, such as a knife 11 is inserted into one end of the channel 4 and urged towards the inner wall 5 of the channel 4 underlying the body of the carpet 10. The blade 11 is then moved along the channel 4 so as to make a cut along the length of the carpet at a shallow oblique angle determined by the angle of inclination of the respective channel side wall 5 relative to the ramp portion 3. The knife blade 11 guided between the respective inner side walls 5 and the facing side of the ridge 6. The marginal strip thereby formed is then discarded. As shown in FIG. 3, the first portion of carpet 10 is moved out of the way and the second portion of the carpet 10 to be joined is then placed on the guide with its margin overlying the channel 4. The blade of the cutting tool 11 is then inserted the channel 4 and is urged towards with that inner wall 5 adjacent, the second portion of carpet 10 and is moved therealong so as to make a cut along the length of the carpet 10 in a similar manner as that just described. The marginal strip on the second portion of carpet is then also discarded. In this way, the two edges have inclined surfaces which correspond to the angle of inclination of the channel 4 of the guide.

The guide is then removed, and the two cut edges are allowed or caused to fall together. The edges of the flexible member or carpet may be stuck down to a floor, sewn together or otherwise, to produce a tidy unobtrusive seam.

In the embodiment shown the width of the base 1 is substantially 10.16 cm, the height from the apex to the underside 2 is 0.95 cm, the width of the channel 4 at the top is 0.15 cm and the depth of the channel 4 is 0.48 cm. The angle formed between the lower end of the inner side walls 5 and the adjacent floor is about 20° or more. The ramp portions 3 are inclined at a second angle 7° to the horizontal. The opposed side walls 5, 5 of the two channels are inclined downwardly and diverge at an angle of substantially 70° in the preferred embodiment. The invention is not limited to the embodiment shown. The guide may be diestamped from a sheet of stainless steel or the like. The inner side walls 5 of the channel 4 may be substantially parallel to each other, and the ramp portions inclined at a more acute angle. The end faces 8, 9 may be formed with interlocking lugs or bayonets so that many guides may be connected together in an end-to-end relation so as to extend the length of the channel 4.

I claim:

1. A cutting guide for use in guiding a cutting tool of the type used to cut flexible sheet material such as carpet or the like, said guide comprising a base having a generally flat bottom surface, said base having inclined upper ramp surfaces to support the carpet to be cut, said guide having an apex portion at the juncture between said ramp surfaces, said apex defining at least two parallel upwardly open channels having oppositely inclined channel guide walls, which guide walls are inclined at opposite angles relative to a normal to the flat bottom surface of at least 20°.

2. The combination according to claim 1, wherein said ramp surfaces are inclined with respect to the flat bottom surface of the guide at an angle of at least approximately 7°.

3. The combination according to claim 2 wherein the included angle defined by the guiding surfaces associated with the first and second upwardly open channels defines an angle in the range between 40° and 70°.

4. The combination according to claim 3 wherein said parallel channels define a ridge therebetween, each of said parallel channels also including an opposite channel wall parallel to the above mentioned guide surface wall, and each channel further including an inner wall oriented transversely with respect to these parallel side walls of each of said channels.

5. The combination according to claim 4 wherein said base has an end face defining an interlocking configuration such that the guide can be joined to another guide of the same geometry to increase the effective length of a guide constructed in accordance with the present invention.

6. The guide according to claim 5 wherein another end of the guide is mitred to form end faces (9, 9) which are useful when cutting carpet at an acute angle.

* * * * *